Feb. 16, 1965

A. H. ADAMS ETAL 3,170,092

ELECTRIC DISTRIBUTION APPARATUS

Filed Sept. 5, 1961

INVENTORS.
ALBERT H. ADAMS
WILLIAM F. OLASHAW
BY
J. Wesley Hauber
ATTORNEY.

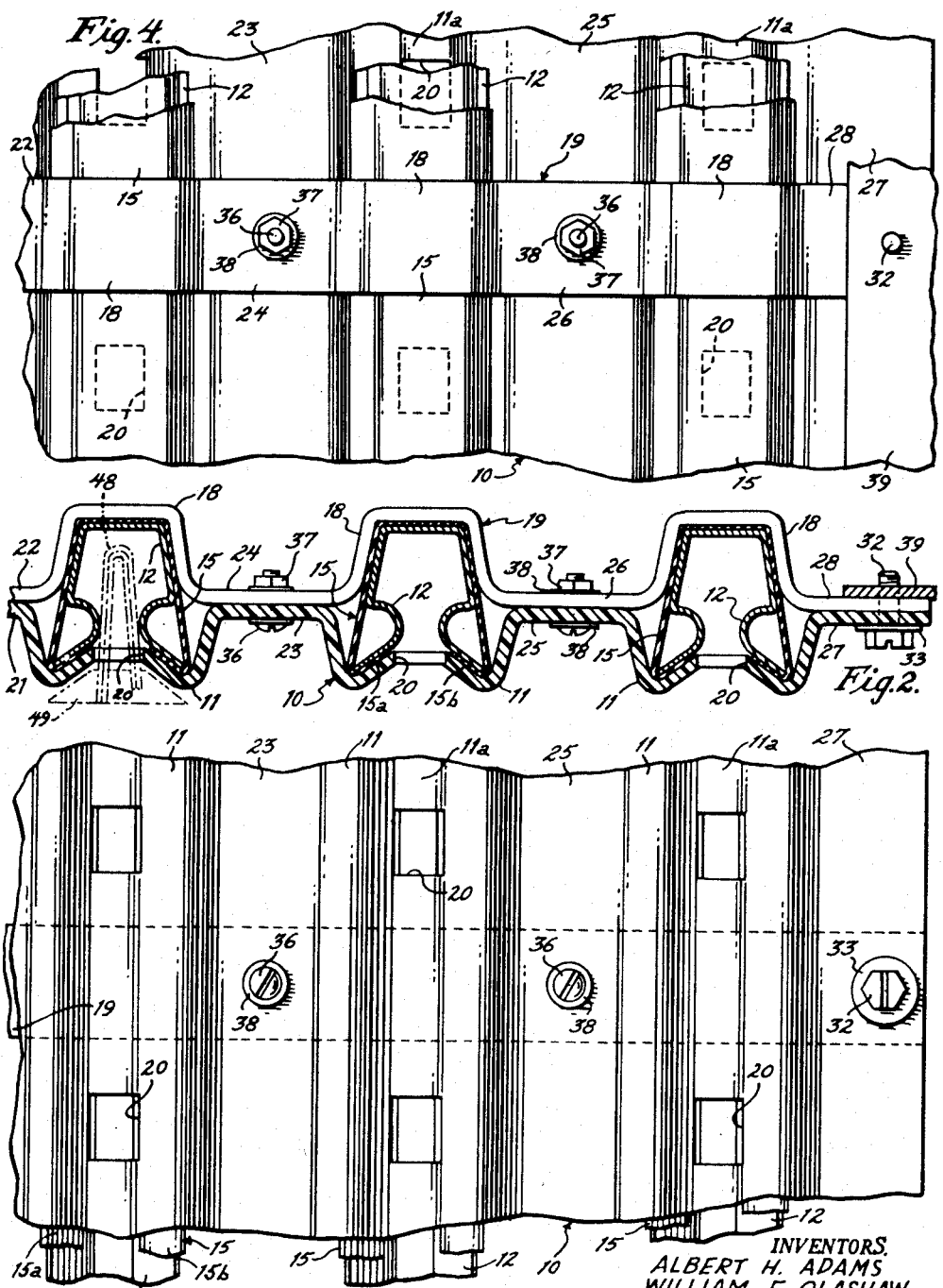

Feb. 16, 1965   A. H. ADAMS ETAL   3,170,092
ELECTRIC DISTRIBUTION APPARATUS
Filed Sept. 5, 1961   5 Sheets-Sheet 3
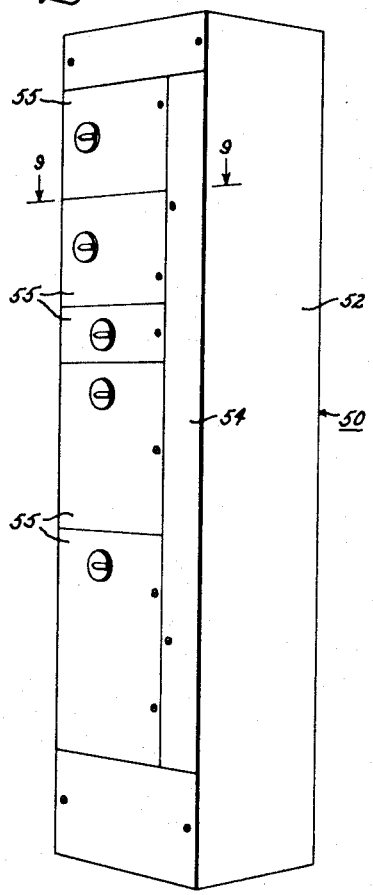
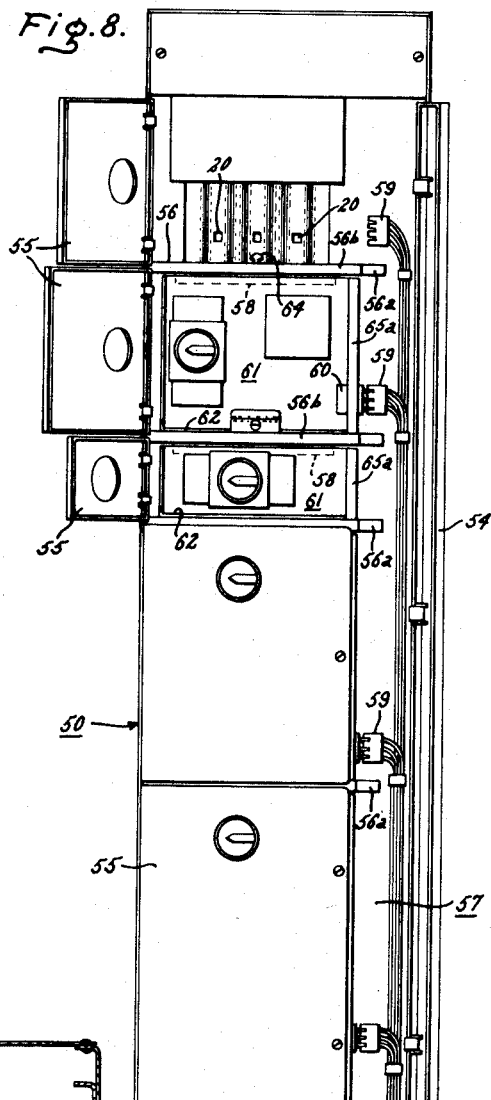
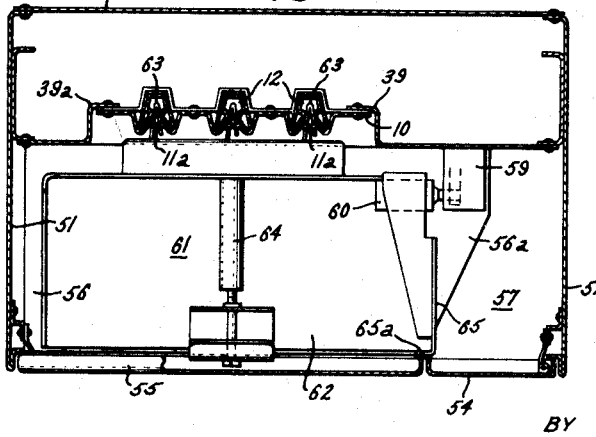
INVENTORS:
ALBERT H. ADAMS,
WILLIAM F. OLASHAW,
BY J. Wiley Hawkins
ATTORNEY.

Feb. 16, 1965

A. H. ADAMS ETAL 3,170,092

ELECTRIC DISTRIBUTION APPARATUS

Filed Sept. 5, 1961

INVENTORS:
ALBERT H. ADAMS,
WILLIAM F. OLASHAW,
BY
ATTORNEY.

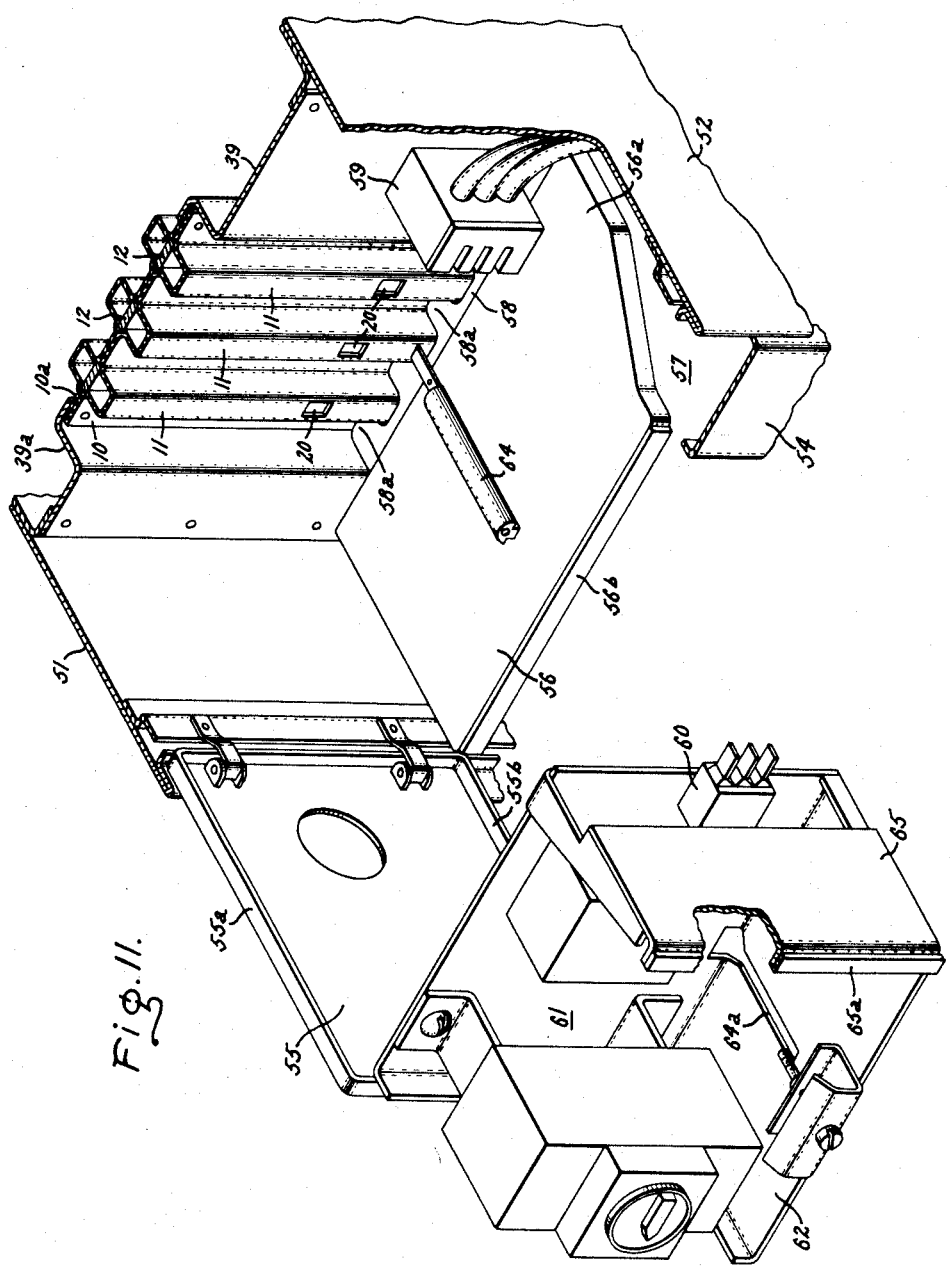

United States Patent Office 3,170,092
Patented Feb. 16, 1965

3,170,092
ELECTRIC DISTRIBUTION APPARATUS
Albert H. Adams, Simsbury, and William F. Olashaw, New Britain, Conn., assignors to General Electric Company, a corporation of New York
Filed Sept. 5, 1961, Ser. No. 135,880
11 Claims. (Cl. 317—120)

This invention relates to electric distribution apparatus, and particularly to multi-compartment cabinets for removably mounting and electrically connecting unit assemblies of electric control apparatus. This application is a continuation-in-part of our application Ser. No. 79,287, filed December 29, 1960, now abandoned.

Systems for distribution of electrical current, such as to a number of motors or the like from a central location, customarily employ heavy duty conductors or buses in elongated form mounted in a compartmented supporting cabinet and adapted to receive electrical probes for conductive contact therewith. If supported only at their ends or at infrequent intervals of their length, such conductors, especially as they become hot and expand during use or as they are exposed to short circuit stresses, are subject to distortion and consequent risk of probe misalignment and faulty contact. Also, if left uncovered or only partly covered by insulation, such bus conductors constitute a safety hazard for operating personnel and are more readily subject to short circuits and consequent equipment damage. Open or partially open bus conductors in a multiple unit motor control cabinet also present the hazard of incomplete electrical isolation between the removable units of control apparatus.

Accordingly, it is one principal object of our invention to provide an improved multi-compartment cabinet for electric control apparatus including an integral electric bus structure especially adapted to serve at once as a full length bus support and as a compartment isolating wall.

A further object of our invention is to provide an improved multi-compartment electric control cabinet structure in which substantially complete electric isolation exists between all compartments containing apparatus units.

It is another primary object of our invention to provide a compartmented electric control cabinet for the support of several apparatus units in which a fully insulated integral bus structure contributes to substantially complete electrical isolation of the several unit compartments.

Other objects and advantages of our invention, together with ways and means of attaining the various objects, will be apparent from the following description and the accompanying diagrams of a preferred embodiment thereof.

FIG. 2 is a cross-sectional view of a three-conductor bus duct apparatus of the form shown fragmentarily at FIG. 1;

FIG. 3 is a front elevational view of the apparatus of FIG. 2, partly cut away;

FIG. 4 is a rear elevational view of the apparatus of FIG. 2, partly cut away;

FIG. 7 is a perspective front elevational view of a multi-compartment electric control apparatus cabinet embodying our invention;

FIG. 8 is a front view of the cabinet of FIG. 7 showing several compartment doors open;

FIG. 9 is a cross-sectional view taken along the line 9—9 of FIG. 7 showing particularly the location of a bus duct structure of the form of FIGS. 1-4;

FIG. 11 is a fragmentary front perspective view of a single cabinet compartment showing a removable control unit in withdrawn position to expose the bus duct and the compartment structure.

In carrying out our invention in one preferred embodiment, we provide an integral bus structure comprising a generally planar channelled sheet of insulating material having an elongated bus conductor fixedly mounted in each channel. The channelled insulating sheet carrying one or more bus conductors is adapted to receive through the bed, or base, of each channel electrical probes for contact with the contiguous bus conductor. Preferably the insulating sheet is provided with several parallel channels and is arranged to support in these channels the several bus conductors of a single or plural phase electrical distribution system. In such form the insulating sheet is of appreciable width so that the complete structure has the form of a channeled wall of insulating material having the bus conductors integrally mounted thereon. The lateral support afforded each bus conductor by the channeled portion of the insulating sheet is supplemented by means of retaining means bridging the open side of the channel and fixed to flanking coplanar body portions of the sheet.

In our improved multi-compartment cabinet for removable support of electric apparatus units, such as motor control units, we utilize such an integral planar bus assembly as a rear wall for the unit compartments. Preferably such rear "bus wall" is positioned in close proximity to the side walls and supporting shelves, thereby to contribute importantly to electric isolation of each compartment from the other compartments. Isolation of the compartments is further enhanced by a shelf configuration complementally interfitting with the channeled insulating sheet and by the use of individual compartment doors gasketed around substantially their entire periphery. In a preferred embodiment of the cabinet structure the supporting shelves terminate short of one cabinet side wall and the control units seated thereon, being thus laterally offset within the cabinet are provided with side walls cooperating with the spaced cabinet sidewall to provide a side-wiring channel. The individual unit doors and a common wiring channel door all seal against gaskets on the front edges of the aligned control unit sidewalls.

Figure 1:
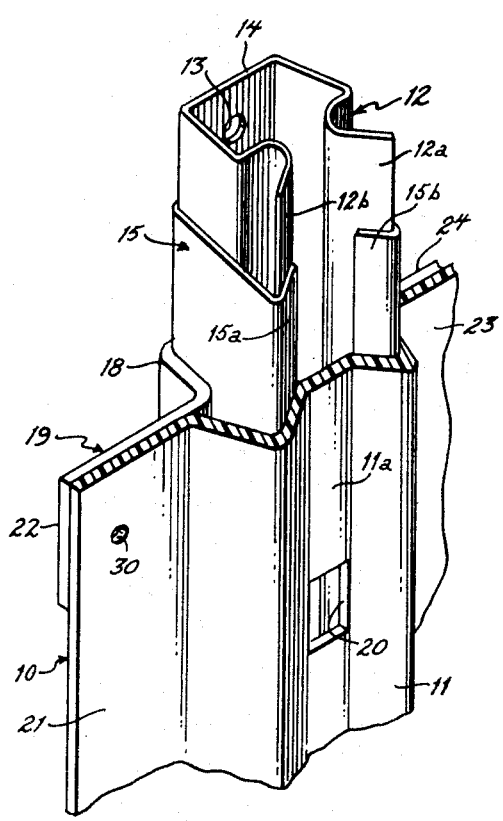
FIG. 1 is a fragmentary perspective view, partly sectioned, of electrical bus distribution apparatus adapted for use in our improved cabinet.

At FIG. 1 we have shown a bus duct structure comprising a generally planar channeled sheet 10 of insulating material sufficiently rigid to be self-supporting. The sheet 10 may, for example, be formed of a material such as a glass-reinforced polyester resin and is provided with one or more elongated channel-like recesses 11 having beveled sides, only one such recess being shown at FIG. 1. Within the recess 11 is positioned an elongated channel-shaped or split tubular electric bus conductor 12 having its opposite sidewalls turned inwardly and then reversely flared outwardly, as at 12a, 12b, to form an elongated slot along one side thereof having flared rims. The slotted side of the conductor 12 lies against the bottom wall or bed of the channel 11 in the insulating sheet 10. An upper end 14 of the bus conductor 12 has a pair of bolt holes 13 (only one being shown) to facilitate connection to a main bus bar, and optionally to an auxiliary bus conductor as set forth hereinafter. The conductor end 14 protrudes from an elongated tubular jacket 15 of channel-shaped insulating material which surrounds the back, sides and part of the flared front or rim of the channel-shaped conductor 12. The channeled insulating sheet 10 includes coplanar flat body portions or flanges 21 and 23 extending to both sides of the channel 11. A central longitudinally extending part 11a of the bed of the forwardly channeled portion 11 of the sheet 10 is indented in conformity with the parallel flared rims or edges of the bus conductor 12 and has apertures 20 (one visible in this view) therein communicating with the interior of the channeled bus conductor 12 by way of the slot-like opening in the front of the insulating jacket 15.

Also visible in FIG. 1 is an oppositely channeled or offset retaining strip 19 juxtaposed to the insulating sheet 10 from the rear and sandwiching the partially jacketed bus conductor 12 between a channeled or offset portion 18 of the strip 19 and channeled portion 11 of the sheet 10. The strip 19 which may be made of any sufficiently strong structural material, conveniently is of metal, hence the presence of insulating jacket 15 between it and the bus conductor. Flat end portion 22 at the left of the strip 19 is juxtaposed to the rear face of flange 21 of the sheet 10, and oppositely extending flat portion 24 of the strip is juxtaposed to the rear face of flat portion 23 of the sheet 10. Beveled oppositely to the sides of the channeled portion of the sheet, the sides of the channeled portion of the strip fit against the adjacent portions of the sides of the jacket 15. Hole 30 visible in the flange of the sheet is located opposite a corresponding hole (not visible) in the end part of the retaining strip to receive suitable means for fastening the respective members together and, if desired, to external supporting structure.

FIG. 2 shows, in plan, sectioned just above retaining strip 19, a multiple busway formed like the single busway of FIG. 1 and accommodating three bus conductors 12, spaced laterally at equal intervals, each in its individual insulating jacket 15. The transverse section of each of these channel-shaped bus conductors resembles the longitudinal section of a wide-mouthed urn (inverted in this view): flat-based with outwardly sloping sides subsequently necking inward and terminating in a flaring rim with its opposite outer edges aligned with the sides. Inturned front edge portions 15a, 15b of each insulating jacket 15 are sandwiched between the inside surface of the bed of channeled portion 11 of the insulating sheet 15 and the flaring rim of the bus. The rim of the bus conductor lies adjacent the bed of the channel with the side edges of the jacket front therebetween and with the neck of the bus directly opposite apertures 20 in the indented central part of the channel bed. Shown in phantom in the leftmost of the busways in this view is probe 48 in the form of a V-shaped stab protruding from supporting block 49, which is beveled to fit into the indented or recessed portion of the channel bed about aperture 20; the stab contacts the neck of the bus conductor and terminates at the apex of the V near the base of the channel of the conductor.

It is also apparent in FIG. 2 that right flange 27 of the sheet is contiguous with rightmost flat end portion 28 of retaining strip 19, which is secured thereto and to supporting structure 39 by bolt 32 threaded therein after passing through washer 33 and then the sheet and the strip as mentioned. The extreme leftmost portions, which were shown in FIG. 1, appear only fragmentarily in this view. Intervening flat sheet portions 23 and 25, which flank the middle channeled portion of the sheet, are held contiguous with respective flat portions 24 and 26 of the strip 19 by means of bolts 36 and nuts 37, together with pairs of washers 38. The beveled edges of channeled portions 11 of the sheet are out of contact with the underlying insulating jackets opposite the necked portions of the bus bars.

FIG. 3 shows, in front elevation, part of the longitudinal extent of the apparatus of FIG. 2; this apparatus is partly cut away at the left and below to show members that otherwise would be wholly or largely hidden in such a view. Thus, a portion of retaining strip 19 is visible at the left, and broken lines suggest its location behind the illustrated part of sheet 10 and in line with bolts 36 and bolt 32, with their respective washers 38 and 33. The visible portion of central part 11a of each channeled portion 11 of the sheet contains two apertures 20, located respectively above an below the level of the retaining strip. Bits of the three respective bus conductors 12 and partially overlying side edges 15a, 15b of their respective insulating jackets 15, aligned with channeled portions 11 of the sheet, are visible where the sheet is cut away at the bottom of this view.

FIG. 4 shows, in rear elevation, much the same part of the longitudinal extent of the apparatus of FIG. 2 as appears in front elevation in the intervening view; it also is partly cut away (here, at the top of the view) to reveal otherwise hidden features. Only a part of supporting structure 39 appears at the right, ahead of end portion 28 of the strip and flange 27 of the sheet, to which it is fastened by bolt 32, of which only the end is visible. The ends of bolts 36 are visible protruding through washers 38 and nuts 37 at the back of intermediate flat portions 23 and 25 of the retaining strip. Jackets 15 are visible surrounding and partly cut away about bus conductors 12 lying in the respective parallel channeled portions (which may be considered to be generally concave corrugations, viewed from this side) of the sheet, and the jackets are cut away to reveal part of the exterior of the conductors.

Figure 5:
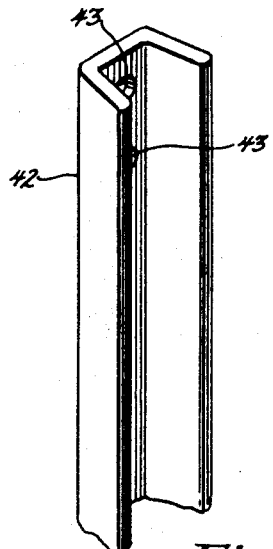
FIG. 5 is a fragmentary perspective view of an auxiliary bus conductor useful with apparatus of the preceding views, according to the present invention.

FIG. 5 shows, in perspective, auxiliary bus conductor 42 (broken off at the bottom) which is of simple channel shape with slightly flaring sides. As is apparent to some extent from FIG. 1 and the preceding description, and as will be more fully apparent from FIG. 6, this conductor is adapted to be used in conjunction with the more complex principal bus conductors 12 previously shown. Boltholes 43 in the auxiliary bus are disposed for juxtaposition to boltholes 13 of the principal bus of the preceding views, and are adapted to receive bolts (not shown) to aid in retaining the respective bus conductors in place and contiguous with one another.

Figure 6:
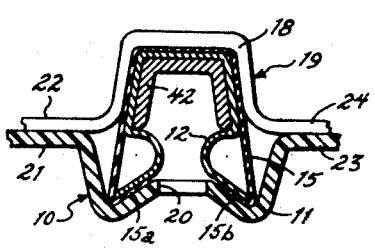
FIG. 6 is a fragmentary cross-sectional plan of the bus apparatus of FIGS. 1-4 showing the auxiliary conductor of FIG. 5 in position.

FIG. 6 shows, in sectional plan (only retaining strip 19 appearing unsectioned), a single busway constructed according to this invention, with auxiliary bus conductor 42 in place therein, together with the principal bus conductor 12 previously shown, as at the left in FIG. 2 but without a stab therein. The flat base and flaring sides of principal bus conductor 12 fit snugly about the exterior of the auxiliary bus conductor in nested relation, and the necked portion of the principal bus curves about the channel edges of the auxiliary bus, thereby retaining the busses in nested position as shown. The principal bus is conveniently retained in place in the busway by pressure of a plurality of retaining strips, like that previously shown, spaced along the rear surface of the insulating sheet between the levels at which successive apertures 20 are located in the sheet itself. The resulting compressive distortion of the principal bus by such strips is adequate to compress the necked portion of such conductor against the channel edges of the auxiliary bus and thereby retain or aid in retaining the respective conductors in the illustrated nested relationship.

The insulating sheets of this invention are readily constructed, as by pressing or molding, from suitable insulating materials, such as polyester or other synthetic resin, preferably reinforced by filaments or fibers of glass or organic polymer. The retaining strips may be similarly composed and formed or may be made up, as indicated above, of conductive material. Whereas the sheets and strips should be substantially rigid, the insulating jackets preferably are resilient; a suitable jacket composition is butyl rubber, which may be molded in the desired configuration, or other similar elastomeric materials adapted to such use will be apparent to persons ordinarily skilled in the art. The probe-receiving apertures may be molded in the insulating sheet or may be punched therein after sheet formation, as may the boltholes, and any other openings, such as may be desired for receiving a guide or the like to ensure proper alignment of the probes. Of course, the bus conductors are made of copper or other good electrical conductor. They can be formed most conveniently from flat bars or sheets by rolling, as will be apparent from their configurations, but pressing, stamping or similar operations may be employed in forming them if desired. The fastening hardware is wholly conventional.

A bus assembly such as that illustrated at FIGS. 1–6 and described above is described and particularly claimed in our co-pending divisional application Ser. No. 325,235, filed November 21, 1963, and assigned to the same assignee as the instant application.

The advantage of lateral support for the bus bars provided by means of the channeled or generally corrugated insulating sheet has been mentioned above and is immediately apparent from the diagrams. Of course, the sheets are adapted to similar use with other bus conductors than those illustrated and described herein, and the overall configuration of the sheets may be altered to accommodate other generally channeled or other bus conductors, or otherwise, while retaining this advantageous feature, although the preferred configurations of sheets and busses have been specified particularly. Similarly, the number, shape and spacing of probe-receiving apertures and retaining strips may be varied without involving a departure from the inventive concept or the benefit of the insulation of bus conductors in the respective busways. The bus bar isolation so provided is an especially advantageous feature in three-phase electrical distribution systems and in cabinet structures for electric apparatus.

At FIGS. 7–11 we have shown a multi-compartment cabinet 50 for electric control apparatus in which the integral sheet-mounted bus duct of our invention is utilized as both an isolating wall and an electric supply duct. Such a cabinet, known to the trade as a motor control center, is generally shown at FIG. 7. The cabinet is of box-like structure having parallel spaced-apart sidewalls 51, 52, a back wall 53, top and bottom walls (not shown) and a plurality of front access doors 54, 55. The door 54 is long and narrow, extending for substantially the full height of the cabinet and is hinged to one sidewall 52 thereof (at right side of the cabinet as viewed in the drawings). The several doors 55 are of modular height and each individually covers one of a plurality of compartments defined by a plurality of shelves 56 within the cabinet. The compartment doors 55 are each hinged to the cabinet sidewall 51 and close against a common stop for the door 54 and all the doors 55, which stop will be fully described hereinafter.

Intermediate the front and back walls of the cabinet 50 and extending transversely between the sidewalls 51 and 52 is a dividing wall and bus duct structure comprising a pair of substantially coplanar and imperforate mounting plates or brackets 39, 39a fixed to and extending vertically along the opposite sidewalls of the cabinet and having their juxtaposed edges spaced apart to define a bus duct opening. Within the opening thus defined and fixed to the inner ends of the plates 39, 39a is mounted a substantially imperforate wall-like bus structure such as that of FIGS. 1 and 4, the insulating sheet 10 being disposed to the front and the parallel bus conductors 12 extending vertically. At their inner ends the plates or brackets 39, 39a are offset to the rear so that the channel beds 11a of the insulating sheet 10 are substantially coplanar with the body portions of the mounting plates 39, 39a. The plates 39, 39a and the intermediate channeled insulating sheet 10 thus combine to provide an integral and substantially imperforate dividing wall on the back of which are mounted the fully insulated and electrically isolated bus conductors 12.

The several apparatus compartments in the cabinet 50 are defined by the horizontal shelves 56, each having its rear edge lying against the mounting plates 39, 39a and one side edge closely adjacent the cabinet sidewall 51. The duct-containing dividing wall thus serves as a rear compartment wall. One side of each shelf 56 is spaced from the cabinet sidewall 52 to leave open a side wiring channel 57 extending substantially the full height of the cabinet. The shelves 56 are supported at these open sides by suitable forwardly extending brackets (not shown) fixed to the mounting plate 39. The opposite side of each shelf 56 is removably seated upon a suitable bracket on the cabinet sidewall 51 and the rear edge of each shelf overlies a channeled-shaped horizontal supporting bar 58 (FIGS. 10 and 11) fixed to the mounting plates 39, 39a and extending across the front of the bus duct.

To improve electrical isolation between the several apparatus compartments the rear mounting bar 58 for each shelf 56 is provided with rearwardly extending ears 58a (FIG. 11) disposed to extend between the channels 11 in the insulating bus sheet 10 and thus to interfit closely in contiguous complemental relation with the sheet 10 across its entire surface. These ears 58a serve as barriers to inhibit transfer of arcs or ionized gases between adjacent apparatus compartments. The barriers or ears 58a may if desired be formed as integral parts of the shelves 56 rather than as parts of the supporting bars 58.

Within the wiring channel 57 and adjacent each unit compartment there is mounted upon the plate 39 a slide contact terminal block 59 disposed for contact engagement with a cooperating terminal block 60 carried by each apparatus unit 61. These contact blocks and their cooperation with certain other features of cabinet structure disclosed herein are more fully described and claimed in an application S.N. 142,340 filed on October 2, 1961 by Robert W. Brokaw and assigned to the same assignee as the instant application. To improve isolation between the terminal blocks 59 the open ends of the shelves 56 have tapered portions 56a extending into the wiring channel at the rear to serve as barriers between the terminal blocks 59. The apparatus units 61 will be more fully described hereinafter.

To further improve compartment isolation the shelves 56 are provided along their front edges with strips 56b of gasket material (FIG. 11) against which inturned upper and lower edges 55a, 55b of the compartment doors 55 seat in sealing relation. Thus the cabinet structure itself provides very effective isolation at top, bottom, front, rear and one side of each compartment by reason of the closely contiguous disposition of the shelf against the rear bus duct wall, against one cabinet sidewall and against the compartment doors. At the opposite side the shelf opens into the side wiring channel 57, and at this side effective isolation is provided by the shelf barriers 56a and by sealing engagement of the cabinet doors with the removable apparatus units 61 in a manner more fully described below.

Referring particularly to FIG. 11, each removable apparatus unit 61 comprises an L-shaped base plate 62 having a bottom wall seating on the cooperating shelf 56 and a rear wall adapted to lie against the front of the bus duct insulating sheet 10. As generally indicated in the drawing, each unit base plate 62 has mounted thereon suitable electric control apparatus, such as switches, relays and the like, and provides at the rear thereof a plurality of connecting stabs 63 (FIG. 9) disposed for insertion into the front apertures 20 of the bus duct. Each unit base 62 is so positioned on the shelf 56 by means of a guide bar 64 on the shelf and cooperating slots 64a in the base (FIG. 11) that it is laterally offset in the cabinet, thereby to leave the wiring channel 57 open. The terminal block 60 is fixed to the unit base 62 at the side adjacent the wiring channel and is disposed for cooperative engagement with the terminal block 59 in the cabinet. At this same side of the unit base 62 there is also provided a partial sidewall or barrier 65 which, when the unit is in position, defines one side wall of the apparatus compartment. The sidewalls 65 of the several apparatus units are in coplanar alignment vertically along one side of the cabinet and spaced from the adjacent sidewall 52 thereof, thereby to define one sidewall of the wiring channel 57. The unit sidewalls or barriers 65 terminate somewhat short of the back wall of the unit base 62 in order to leave space for mounting upon such back wall the movable terminal block 60, the contacts of which must extend into the wiring channel 57 for engagement with the block 59.

The front edges of the aligned unit barriers 65 are each turned over to form a plurality of vertically aligned flanges which together provide a common stop for all the doors 54 and 55. Each barrier provides a stop for one individual unit door 55 and the aligned barriers serve also as a stop for the separate wiring channel door 54. Preferably a strip of gasket material 65a overlies the front edge or flange of each barrier 65 to improve sealing against the doors and thus to improve compartment isolation. As shown at FIG. 8 the shelf side extensions 56a protrude beyond the barrier walls 65 and partially into the wiring channel 57 thereby to further improve isolation between the cabinet contact blocks 59.

Figure 10:
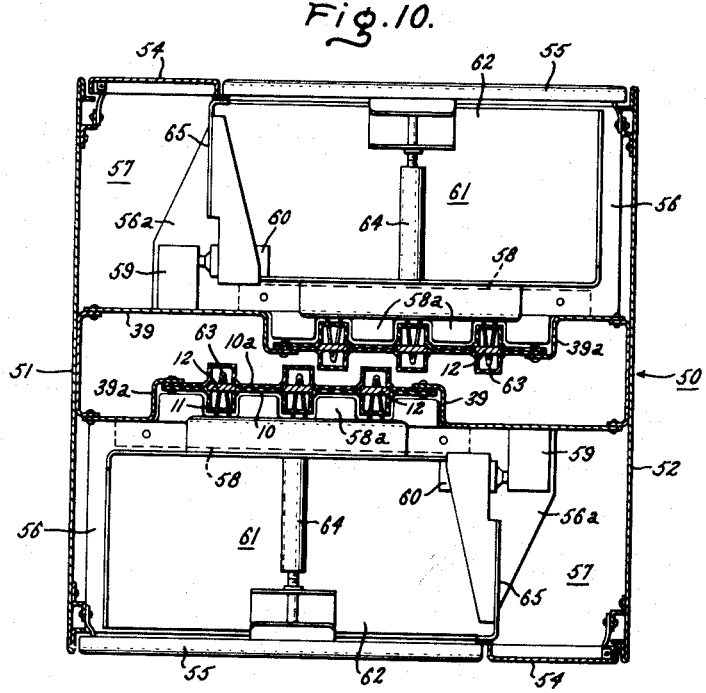
FIG. 10 is a cross-sectional view similar to FIG. 9 showing a cabinet structure and bus duct structure each of alternative form and embodying our invention in its various aspects.

Certain improved embodiments of our invention not previously mentioned are illustrated at FIGS. 10 and 11. In each of these figures there is shown an improved form of bus duct incorporating our invention wherein the bus conductors 12 are sandwiched between two identical channeled sheets 10, 10a of insulating material and the sheets are fixed together in opposite face-to-face relation to form therebetween tubular channels within which the bus conductors 12 are mounted in clamping relation. This form of bus duct is morefully described and claimed in an application S.N. 80,112, filed Jan. 3, 1961, by Albert H. Adams, now Patent No. 3,096,131, issued July 2, 1963, for electrical bus conductor and assigned to the same assignee as the instant application. In addition, the guide bar 64 for each apparatus unit is more fully described and claimed in co-pending application Serial No. 137,907, filed Sept. 13, 1961, by William F. Olashaw, now Patent No. 3,142,003, issued July 21, 1964, and assigned to the same assignee as the instant invention.

FIG. 10 also serves to illustrate that the cabinet 50 may be of double ended, or back-to-back construction having doors 54, 55 at both front and back and having apparatus unit compartments at both front and back. As evident from FIG. 10, a separate bus duct rear wall is provided for each vertical group of apparatus compartments.

It will now be evident that by utilizing the channeled insulating sheet bus structure of our invention we have provided an electric control cabinet having several novel features which mutually contribute to improve electrical isolation of the several apparatus compartments. Primarily the improved isolation results from use of the sheet-mounted bus duct as a compartment rear wall in cooperation with individual unit doors arranged to seal against the supporting shelves and against aligned wiring channel barriers on laterally offset apparatus units. By thus sealing off a separate wiring channel and providing a separate access door for the channel, hazards to personnel are minimized whenever access is desired to the wiring channel alone or to any one of the apparatus compartments alone.

While we have described only certain preferred embodiments of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. A multi-compartment cabinet for removably mounting and enclosing a plurality of unit assemblies of electric apparatus comprising a vertically standing housing having spaced apart sidewalls and a back wall, a substantially inperforate dividing wall extending between said sidewalls parallel to said back wall and within said cabinet, said dividing wall including an integral sheet of electric insulating material having electric bus bars mounted thereon behind the front surface thereof, said insulating sheet having front opening stab contact apertures therein providing conductor access to said bus bars, and a plurality of horizontal supporting shelves mounted in said cabinet in front of said dividing wall and having their rear edges closely juxtaposed to said insulating sheet thereby to define a plurality of apparatus compartments, said insulating sheet extending vertically throughout at least that portion of the height of said cabinet which is occupied by said apparatus compartments.

2. A cabinet according to claim 1 wherein the front wall of said cabinet comprises a plurality of individual compartment doors each closing at its upper and lower edges against the front edges of two of said shelves.

3. A multi-compartment cabinet for removably mounting and enclosing a plurality of unit assemblies of electric apparatus comprising a vertically standing housing having spaced apart sidewalls and a back wall, a substantially imperforate dividing wall extending between said sidewalls parallel to said back wall and within said housing, said dividing wall including an integral sheet of electric insulating material having electric bus bars mounted thereon behind the front surface thereof, said insulating sheet having front opening stab contact apertures providing conductor access to said bus bars, a plurality of horizontal supporting shelves mounted in said cabinet in front of said dividing wall and defining a plurality of apparatus compartments, said shelves being laterally offset in said cabinet to provide at one side thereof an elongated vertical wiring channel, a plurality of electric apparatus units in said compartments, each having a mounting base seated upon one said shelf and including a side barrier wall adjacent said wiring channel, said unit barrier walls having aligned front edges substantially in the plane of the front of said cabinet, a plurality of individual compartment doors hinged to the front of said cabinet at one side thereof and each seating when closed against the front edge of one said unit barrier wall and the front edges of two of said shelves, and a separate front closure member for said wiring channel, said insulating sheet extending vertically throughout at least that portion of the height of said cabinet which is occupied by said apparatus compartments.

4. A cabinet according to claim 3 in which the front closure member for the wiring channel comprises a separate elongated door hinged to said housing at the other side thereof and seating when closed upon the aligned front edges of all said unit barrier walls.

5. A multi-compartment cabinet for removably mounting and enclosing a plurality of unit assemblies of electric apparatus comprising a vertically standing housing having spaced apart sidewalls and a back wall, a substantially imperforate dividing wall extending between said sidewalls parallel to said back wall and within said housing, said dividing wall including an integral sheet of electric insulating material having electric bus bars mounted thereon behind the front surface thereof, said insulating sheet having front opening stab contact apertures providing conductor access to said bus bars, a plurality of horizontal supporting shelves mounted in said cabinet in front of said dividing wall and defining a plurality of apparatus compartments, said shelves being laterally offset in said housing to provide at one side an elongated vertical wiring channel, a first slide contact terminal block mounted in said channel adjacent each said shelf, a plurality of electric apparatus units removably mounted in said compartments respectively upon said shelves and each having at the rear thereof a plurality of stab contacts for cooperation with said bus bars and including a second slide contact terminal block disposed for cooperation with a juxtaposed first terminal block in said wiring channel, barrier extensions integral with said shelves extending into said wiring channel between cooperating pairs of said terminal blocks, and a plurality of individual compartment doors hinged to the front of said cabinet at one side thereof and each seating when closed upon the front edges of an adjacent pair of said shelves, said insulating sheet extending vertically throughout at least a major portion of that part of said cabinet which is occupied by said apparatus compartments.

6. A multi-compartment cabinet for removably mounting and enclosing a plurality of unit assemblies of electric apparatus comprising a vertically standing housing having spaced apart sidewalls and a back wall, a substantially imperforate dividing wall extending between said sidewalls parallel to said back wall and within said housing, said dividing wall including an integral sheet of electric insulating material having electric bus bars mounted thereon behind the front surface thereof, said insulating sheet having front opening stab contact apertures providing conductor access to said bus bars, a plurality of horizonal supporting shelves mounted in said cabinet in front of said dividing wall defining a plurality of apparatus compartments, said shelves being laterally offset in said housing to provide at one side thereof an elongated vertical wiring channel, a plurality of electric apparatus units in said compartments respectively, each having a mounting base seated upon one said shelf and including a side barrier wall adjacent said wiring channel, said unit barrier walls having aligned front edges substantially in the plane of the front of said cabinet, a terminal block mounted in said wiring channel adjacent each said apparatus unit, barrier extensions integral with said shelves extending into said wiring channel between said terminal blocks, and a plurality of individual compartment doors hinged to the front of said housing at one side and each seating when closed against the front edge of one said unit barrier wall and the front edges of adjacent pairs of said shelves, said insulating sheet extending vertically throughout at least a major portion of that part of said cabinet which is occupied by said apparatus compartments.

7. A multi-compartment cabinet for removably mounting and enclosing a plurality of unit assemblies of electric apparatus comprising a vertically standing housing having spaced-apart sidewalls and a back wall, a substantially imperforate dividing wall extending between said sidewalls parallel to said back wall and within said housing, said dividing wall including substantially imperforate spaced-apart side mounting strips and an intermediate channeled sheet of electric insulating material, electric bus bars mounted within the channel recesses of said insulating sheet at the rear thereof, said insulating sheet material having front opening stab contact apertures in the channeled portions thereof providing conductor access to said bus bars, and a plurality of horizontal supporting shelves mounted in said cabinet in front of said dividing wall and defining a plurality of apparatus compartments, said insulating sheet extending vertically throughout at least a major portion of that part of said cabinet which is occupied by said apparatus compartments.

8. A cabinet according to claim 7 in which barrier means associated with each said supporting shelf interfits in close complemental contour across the front surface of said channeled sheet of insulating material.

9. A cabinet according to claim 7 in which the rear edge of each said shelf is provided with barrier means complementally contoured to interfit with the channeled transverse configuration of said sheet of insulating material and in which the front wall of said cabinet comprises a plurality of individual compartment doors each closing at its upper and lower edges against the front edges of a pair of adjacent shelves.

10. An electrical control apparatus assembly removably mounting and enclosing a plurality of unit assemblies of electrical apparatus comprising, a vertically standing housing having spaced apart side walls and a back wall, a generally planar dividing wall extending between said side walls parallel to and spaced away from said back wall within said cabinet, said dividing wall including an integral sheet of electric insulating material having vertically extending parallel channel portions, a plurality of electric bus bars in said channels respectively, said insulating sheet having front opening stab contact apertures therein providing conductor access to said bus bars, a plurality of unit assemblies of electrical apparatus in said housing each of said assemblies having a plurality of stab contacts extending through said apertures in said sheet of insulating material, said insulating sheet extending vertically throughout at least a major portion of that part of said cabinet which is occupied by said unit assemblies of electrical apparatus.

11. An electrical apparatus assembly removably mounting and enclosing a plurality of unit assemblies of electrical apparatus comprising a vertically standing housing having spaced apart side walls and a back wall, a generally planar dividing wall extending between said side walls parallel to and spaced away from said back wall within said cabinet, said dividing wall including a sheet of electric insulating material, said insulating sheet having a plurality of elongated vertically extending parallel channel portions, a plurality of elongated electrical bus bars in said channels respectively, said insulating sheet having front opening stab contact apertures therein providing conductor access to said bus bars, each of said unit assemblies of electrical apparatus including a plurality of contact stabs extending through said contact apertures into electrical engagement with said bus bars, said housing including means slidably supporting each of said unit assemblies for movement toward and away from said dividing wall, said insulating sheet extending vertically throughout at least the major portion of that part of said cabinet which is occupied by said unit assemblies of electrical apparatus.

References Cited by the Examiner
UNITED STATES PATENTS

| 1,955,168 | 4/34 | Beersman | 339—21 |
| 2,641,636 | 6/53 | Born et al. | 317—120 |
| 2,645,743 | 7/53 | De Smidth | 317—120 |
| 2,719,251 | 9/55 | Stewart | 317—120 |
| 2,767,354 | 10/56 | Jackson et al. | 317—120 |
| 2,968,782 | 1/61 | Herrmann et al. | 174—99 |
| 3,066,244 | 11/62 | Defandorf et al. | 317—120 |
| 3,096,131 | 7/63 | Adams | 317—119 |

JOHN F. BURNS, *Primary Examiner.*